Patented May 5, 1942

2,281,576

UNITED STATES PATENT OFFICE 2,281,576

POLYAMIDES AND PROCESS OF MAKING SAME

William E. Hanford, Wilmington, Del., assignor to E. I. du Pont de Nemours & Company, Wilmington, Del., a corporation of Delaware No Drawing. Application October 24, 1939, Serial No. 301,069

14 Claims. (Cl. 260—78)

This invention relates to polymeric materials and more particularly to the preparation of synthetic linear polyamides.

The polyamides with which this invention is concerned are of the type described in U. S. Patents 2,071,250 and 2,130,948. These polyamides are obtained by heating under polyamide-forming conditions chemically equivalent amounts of diamines with dicarboxylic acids or their amide-forming derivatives. It has been preferred previously, however, to select diprimary diamines having radial lengths of at least 6 because these diamines, unlike those of lower radical length, have no tendency to yield cyclic, low molecular weight by-products but readily lead to the formation of the high molecular weight linear fiber-forming polyamides in good yield. The term "radical length" is defined as in Patent 2,130,948 as meaning the number of atoms in the chain of the radical of the diamine or dibasic acid.

This invention has as an object a new and improved process for the preparation of linear polyamides from diamines which do not react smoothly with dibasic acids to form polyamides by the ordinary methods. A specific object is the preparation of linear polyamides from diamines of radical length less than 6 which, as observed above, tend to give poor yields of linear polyamides by the usual methods because of side reactions. A further object is the production from such diamines of linear polyamides which can be spun into filaments. Other objects will appear hereinafter.

These objects are accomplished by reacting said diamine, which will be referred to herein as the "refractory diamine", with at least two chemical equivalents of dicarboxylic acid, or its amide-forming derivative, having a radical length of at least 5, and then reacting the resulting intermediate under polymerizing conditions with a substantially chemically equivalent amount of diamine having a radical length of at least 6, the diamine in each instance being one in which each amino nitrogen carries at least one replaceable hydrogen atom. Thus ethylene diamine may be reacted with adipic acid in the mentioned excess in the first step and the product obtained reacted with hexamethylene diamine. It is preferred to use an amide-forming derivative of the dicarboxylic acid, and particularly the acid chloride of a half ester since the acid chloride group reacts very readily with the diamine to give the desired intermediate. Other amide-forming derivatives, such as a diester or monomeric anhydride may, however, be used. The reactions involved in this process of preparing polyamides may be represented by the following equations:

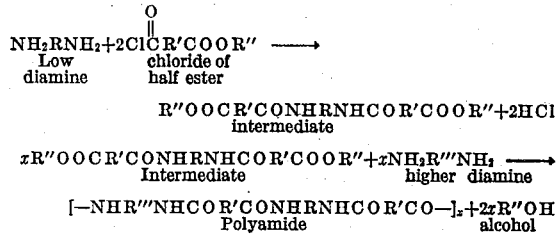

In these formulas R is a divalent organic radical having a chain of less than 4 atoms separating the amino groups, R' is a divalent organic radical having a chain of at least 3 carbon atoms separating the acid groups, R''' is a divalent organic radical having a chain of at least 4 atoms separating the amino groups, and R'' is a monovalent hydrocarbon radical. Generally R, R' and R''' will be hydrocarbon radicals.

In the preferred method of carrying out my invention one mol of the refractory diamine, e. g. a diprimary diamine having a radical length less than 6, is reacted with at least 2 mols of an acid chloride of a half ester of a dicarboxylic acid having a radical length of at least 5 in the presence of an acid binding agent such as sodium hydroxide. In the second step the intermediate obtained, either the isolated diester or the dicarboxylic acid obtained from it by hydrolysis, is reacted under polymerizing conditions with a chemically equivalent quantity of a diprimary diamine having a radical length of at least 6. This invention, however, is not limited to reacting the diamine and the diamine-dicarboxylic acid intermediate directly under polymerizing conditions, since this second stage of the reaction may be conducted to form the diamine-dicarboxylic acid salt which can later be polymerized.

When the said salt is thus formed, in the second stage of the reaction, its formula, as illustrated for the simpler reactants, may be represented as

(in which $x$, $y$, and $z$ are integers, $x$ being at least 4, $y$ being at least 3 and $z$ being less than 4), since the salt is derived from the reaction of a diamine of the formula $NH_2(CH_2)_xNH_2$ and a dicarboxylic acid of the formula

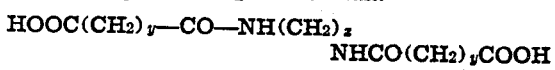

(in which $x$, $y$ and $z$ are integers, $x$ being at least 4, $y$ being at last 3 and $z$ being less than 4). Consequently on polymerization of the said salt, the recurring structural units of the resulting polymer have the general formula

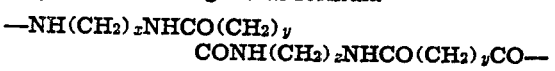

(in which $x$, $y$, and $z$ are integers, $x$ being at least 4, $y$ being at least 3 and $z$ being less than 4), which general formula is the same as that of the polymer resulting from the direct polymerization of the second stage reactancts, without preliminary formation and isolation of the said salt.

The first step of the present invention is carried out most conveniently with a large excess of the dicarboxylic acid or its amide-forming derivative. This procedure favors normal amidation and hence leads to compounds which behave normally under condensation polymerization conditions. It is preferred to isolate and purify the resultant intermediate, which consists of the reaction product of one mol of the refractory diamine and two mols of a dicarboxylic acid or derivative having a radical length of at least 5, before reacting it in the second step of the process with a diprimary diamine having a radical length of at least 6.

In the second step of the invention, the above mentioned intermediate functions as a dicarboxylic acid or an amide-forming derivative thereof. If the intermediate is used in the form of the free acid, the first reaction which occurs on admixture with the diamine is the formation of a salt. The preparation of the salt, although not a necessary step, affords an automatic means for adjusting the amine and acid reactants to substantial equivalency and tends to eliminate impurities present in the original diamine and dicarboxylic acid, and as a rule the diamine-dicarboxylic salts are soluble in water and may be crystallized from certain alcohols or alcohol-water mixtures. The preparation of fiber-forming polyamides from the diamine-dicarboxylic salts can be carried out in the same manner as described for the simpler diamine-dicarboxylic acids in U. S. Patent 2,130,948.

In place of using the diamine and dicarboxylic acid (or the salt) as described above, substantially chemically equivalent quantities of a diamine having a radical length of at least 6, and an amide-forming derivative of the dicarboxylic acid prepared as previously described may be used for the preparation of the polymer. The reaction can be carried out by the general processes described in U. S. Patent 2,130,948. If a fiber-forming product is desired, the final reaction conditions should be such that the by-product of the reaction, except when the by-product is a monohydric phenol, can escape.

The polymerization reaction in the second step of the process is usually effected at a temperature of from 150 to 300° C. In the preferred embodiment of the invention the reaction is continued until the polymer exhibits fiber-forming properties. The optimum time and temperature are determined in part by the nature of the reactants, in part by the melting point of the resultant polymer, and in part by the size of the batch. In general the polymerization is carried out at a temperature slightly above the melting point of the polymer, although spinnable products can be obtained by heating the massive polymer in a solid state under vacuum at temperatures of 200–220° C. The necessary conditions for the preparation of fiber-forming polymers vary according to the particular case, but in practice, the conversion to a fiber-forming polymer is easily tested by merely touching the surface of the molten polymer with a rod and withdrawing the rod; if the fiber-forming stage is reached a continuous filament of considerable strength and pliability is readily obtained. The degree of polymerization also may be followed by determining the intrinsic viscosity of a solution of the polymer in meta-cresol as described in U. S. Patent 2,130,948. The fiber-forming state is reached when the polyamide has an intrinsic viscosity of about 0.4. If products capable of being formed into fibers of optimum quality are to be obtained, it is desirable to prolong the heating beyond that point where the intrinsic viscosity has become 0.4. In general, polymers having an intrinsic viscosity between 0.5 and 2.0 are most useful for the preparation of fibers. The heating treatment necessary to produce products qualified for spinning must be determined for each polymer as inferior products result if the heat treatment is continued for periods of too long or too short duration.

Although polyamides compared to most organic compounds are fairly resistant to oxidation, the high temperatures required for their preparation cause discoloration in the presence of air and for this reason it is desirable to carry out the polymerization reaction in the presence of an inert gas, such as nitrogen, hydrogen, or $CO_2$. It is also important to exclude oxygen from the polymer during spinning, especially if the polymer is being spun by the melt process.

In general, no added catalysts are required in the above processes of this invention. However, certain materials such as inorganic materials of alkaline reaction, such as oxides and carbonates, acidic materials such as halogen salts of polyvalent metals, e. g., stannous chloride, certain neutral salts, e. g. magnesium sulfate, and silica appear in many cases to exercise a certain degree of catalytic activity. Another important class of compounds capable of exerting catalytic functions are strong acids of which phosphoric, sulfuric, borophosphoric and p-toluenesulfonic acids are examples.

For certain purposes it is desirable that the interpolymers be viscosity stable, i. e., do not alter appreciably in viscosity (molecular weight) when heated at their melting points. Viscosity stable polyamides can be prepared by using a small excess (up to about 5 mol per cent) of the diamine or dicarboxylic acid reactant, or by incorporating in the reaction mixture a small amount, generally 0.1–5.0 molar per cent, of a monoamine or monocarboxylic acid or amide forming derivative thereof. Acetic acid, 2-ethylhexylamine and ethylbutyrate are examples of viscosity stabilizers.

Example I

To a solution of 3 parts of ethylenediamine in 75 parts of benzene was added 8 parts of finely powdered sodium hydroxide. To this mixture was added dropwise with stirring 20 parts of delta-carbomethoxyvaleryl chloride. The inorganic material was removed by filtration, the benzene extract concentrated and on cooling the diester, $$H_3COOC-(CH_2)_4-CO-NH-CH_2-CH_2-NH-CO-(CH_2)_4-COOCH_3$$

(7 parts) separated in the form of glistening thin plates which melt at 141–142° C.

To a solution of 1.5 parts of sodium hydroxide in 25 parts of water at room temperature was added 3.2 parts of the diester and the mixture shaken thoroughly. After the course of a few minutes a clear solution was obtained and after standing for 5 minutes was acidified with dilute hydrochloric acid. The precipitate of colorless dicarboxylic acid, $$HOOC-(CH_2)_4-CONH-CH_2CH_2-NHCO-(CH_2)_4-COOH$$

was obtained in the form of glistening plates which melt at 185–186° C. after crystallization from water.

To a suspension of 12.64 parts of the above dicarboxylic acid in 100 parts of boiling 95% alcohol was added a solution of 4.86 parts of hexamethylenediamine in 20 parts of 95% alcohol. Sufficient water was added to the boiling solution to dissolve the precipitated diamine-dicarboxylic acid salt, the solution filtered, 100 parts of 95% alcohol was added and the solution was cooled to 0° C. with occasional stirring. The colorless microscopic crystals were collected, washed several times with 95% alcohol and finally with ether. The yield of salt melting at 200–202° C. was 16 parts and the salt contained 0.12% excess amine.

To prepare the polymer, 5 parts of the diamine-dicarboxylic salt was heated in a closed reaction vessel during 1.3 hours at 200–240° C. and then under reduced pressure during 1 hour at 200–260° C. The polymer, $$[-HN(CH_2)_2-NHCO-(CH_2)_4-CONH-(CH_2)_6-NHCO(CH_2)_4-CO-]_x$$

thus formed was a hard, rather tough, opaque solid which melted to a viscous liquid at about 230° C. The material could be drawn into continuous filaments by touching the molten polymer with a rod and withdrawing the rod. The intrinsic viscosity of a solution of the polymer in meta-cresol was 0.57. It is insoluble in common solvents under ordinary conditions, but is soluble in formic acid and phenol.

Example II

Five parts of the above described diamine-dicarboxylic salt, $$[-HN(CH_2)_2-NHCO-(CH_2)_4-COONH_3-(CH_2)_6-NH_3OOC(CH_2)_4-CO-]_x$$

was heated in a closed reaction vessel during 1.8 hours at 195–250° C. and then under reduced pressure during 2 hours at the same temperature. The polymer prepared by this method had an intrinsic viscosity of 0.55 and melted at 230° C. Continuous filaments were obtained by touching the molten polymer with a rod and withdrawing the rod.

It is within the scope of this invention to react first one mol of the refractory diamine or mixtures of such diamines with 2 mols of a dicarboxylic acid or amide-forming derivative thereof having a radical length of at least 5 or mixtures of such dicarboxylic acids under amide-forming conditions, and then to react this intermediate without further purification with the required amount of diamine or diamines having a radical length of at least 6 to bring about equivalency of amino and carboxylic groups. Other linear polymer-forming reactants which react with carboxylic acid groups can be substituted for a part or all of the diamine having a radical length of at least 6. For example, glycols may be used for this purpose. Other linear polymer-forming compositions, e. g. monohydroxy-monocarboxylic acids and monoamino-monocarboxylic acids may also be added.

Although this invention is of greatest value in the preparation of polyamides from diamines which do not react smoothly and readily with dibasic acids to form polyamides, the invention is also applicable to the preparation of polyamides from diamines which do not offer any trouble in polyamide-formation when reacted with dibasic acids. Thus, the invention can be applied to diprimary diamines of high radical length, e. g. hexamethylenediamine and decamethylenediamine. In general, however, direct reaction of the higher diprimary diamine with a chemically equivalent amount of dibasic dicarboxylic acid, i. e. the process of U. S. Patent 2,130,948, will be the more economical process of preparing polyamides from such diamines.

The preferred embodiment of this invention comprises heating the reactants until they exhibit fiber-forming properties, but the heating may be discontinued before the fiber-forming stage is reached. The low molecular weight or non-fiber forming polymers are useful in molding and coating compositions.

Diamines other than those previously mentioned which have a radical length less than 6 may be used in the practice of this invention. Other examples of these compounds are hydrazine, methylenediamine, propylenediamine, butylenediamine (the structure of which, as shown in the third entry in the table of "Diamines" set out at the food of page 2 of U. S. P. 2,130,523, has the formula $$CH_3CH_2-CHNH_2CH_2NH_2);$$

N,N'-dimethylhydrazine, N,N'-diethylhydrazine, N,N'-diethylmethylenediamine, N,N'-dipropylethylenediamine, trimethylenediamine, 2-methyltrimethylenediamine, 2,2-dimethyltrimethylenediamine and 1-methyltrimethylenediamine. Aromatic diamines, e. g. m-phenylenediamine and 2,4-toluylenediamine, can also be used although these diamines show less tendency to form ring compounds than do aliphatic diamines. As examples of refractory diamines having a radical length greater than 6 may be mentioned secondary diamines, e. g. N,N'-dimethyldecamethylene diamine.

The diamines used in the second stage of the reaction, as well as the dicarboxylic acids and derivatives employed in the process, may be those listed in the above mentioned U. S. Patent 2,130,948. As examples of diamines having a radical length of at least 6 which can be used in the second stage of the reaction may be mentioned tetramethylenediamine, 1-methyltetramethylenediamine, pentamethylenediamine, hexamethylenediamine, 3-methylhexamethylenediamine, 2,5 - dimethylhexamethylenediamine, octamethylenediamine, decamethylenediamine, 1,10 - dimethyldecamethylenediamine, triglycoldiamine, gamma, gamma'-diaminodipropyl ether, and p-xylylenediamine.

In place of the acid chloride of the half-ester of adipic acid used in the above example, other acid halides of the half-esters of dicarboxylic acids having a radical length of at least 5 may be used, and such acid halides as can be prepared from methyl hydrogen glutarate, ethyl hydrogen adipate, propyl hydrogen pimelate, phenyl hydrogen suberate, methyl hydrogen sebacate and methyl hydrogen isophthalate might be mentioned. Monomeric anhydrides such as glutaric anhydride and adipic anhydride may be used instead of the acid halides of the half-esters of dicarboxylic acids to prepare the intermediate dicarboxylic acid.

The polyamides of this invention are relatively high melting, chemically inert solids whose solubility characteristics can be modified by varying the composition of the reactants. The products of this invention can be used in preparation of fibers for use in the textile art, as for example, in the preparation of knitted, woven, and pile fabrics, yarns, ropes, cords and many special cloths. Other uses for fibers in suitable form include artificial hair and bristles. Sheet material prepared from the polyamides of this invention finds uses in certain applications, particularly after they have been cold rolled. Typical uses are wrapping foil, leather substitute, gaskets, washers, lamp shades, bottle caps, belting, playing cards, and fiber board substitutes. By a proper choice of reactants it is possible to prepare products, e. g., interpolymers by including other linear-polymer forming reactants, which possess good solubilities which make them useful as ingredients in coating and impregnating compositions. For example, the interpolymers can be used to coat paper, cloth, leather, bookbinding and other materials, from melt or from solution. The interpolymers can be used as clear lacquers and, in the form of pigmented enamels, as paints. Rubber may also be coated with polyamides to decrease the sensitivity to aromatic hydrocarbons. Solutions of the polyamides of this invention may also be cast into clear, tough films which can be used for wrapping and packaging material. For these purposes the products of this invention may be mixed with other materials such as plasticizers, pigments, resins, cellulose derivatives, simple polyamides, polyamide-esters and polyesters.

The present invention is a valuable improvement in this art since it provides a superior process for the ready production of polyamides from a large class of commercially available diamines which are less suited to the production of valuable linear polyamides by the methods heretofore practiced. The process of this invention is advantageous because these refractory diamines tend to undergo intermolecular condensation or other side reactions when reacted with dibasic acids under the conventional methods for the preparation of polyamides, whereby a portion of the diamine is destroyed. As these diamines include those most readily available this invention presents valuable economic advantages.

As many apparently widely different embodiments of this invention may be made without departing from the spirit and scope thereof, it is to be understood that I do not limit myself to the specific embodiments thereof except as defined in the appended claims.

I claim:

1. A process which comprises reacting, at amide-forming temperatures, a diamine having a radical length less than 6 with at least two chemically equivalent amounts of a substance having a radical length of at least 5 of the class consisting of dicarboxylic acids and their amide-forming derivatives, and then adding to the resulting intermediate, and reacting therewith a substantially chemically equivalent amount of a diamine having a radical length of at least 6, both of said diamines having at least one replaceable hydrogen atom on each amino nitrogen atom.

2. A process which comprises reacting, at amide-forming temperatures, a diamine having a radical length less than 6 with at least two chemically equivalent amounts of an acid halide of a half-ester of a dicarboxylic acid having a radical length of at least 5, and then adding to the resulting intermediate, and reacting therewith at amide-forming temperatures, a substantially chemically equivalent amount of a diamine having a radical length of at least 6, both of said diamines having at least one replaceable hydrogen atom on each amino nitrogen atom.

3. A process which comprises reacting, at amide-forming temperatures, a diamine having a radical length less than 6 with at least two chemically equivalent amounts of a diester of a dicarboxylic acid having a radical length of at least 5, and then adding to the resulting intermediate, and reacting therewith at amide-forming temperatures, a substantially chemically equivalent amount of a diamine having a radical length of at least 6, both of said diamines having at least one replaceable hydrogen atom on each amino nitrogen atom.

4. A process for making polyamides which comprises reacting, at amide-forming temperatures, a diamine having a radical length less than 6 with at least two chemical equivalents of a substance having a radical length of at least 5 of the class consisting of dicarboxylic acids and their amide-forming derivatives, and then adding to the resulting intermediate, and heating therewith under polymerizing conditions, a substantially chemically equivalent amount of a diamine having a radical length of at least 6, both of said diamines having at least one replaceable hydrogen atom on each amino nitrogen atom.

5. A process for making polyamides which comprises reacting, at amide-forming temperatures, a diprimary diamine having a radical length less than 6 with at least two chemical equivalents of a substance having a radical length of at least 5 of the class consisting of dicarboxylic acids and their amide-forming derivatives, and then adding to the resulting intermediate, and heating therewith under polymerizing conditions, a substantially chemically equivalent amount of a diprimary diamine having a radical length of at least 6, until the resulting polyamide has an intrinsic viscosity of at least 0.4.

6. A process for making polyamides which comprises reacting, under amide-forming temperatures, a diprimary diamine having a radical length less than 6 with at least two chemical equivalents of an acid halide of a half-ester of a dicarboxylic acid having a radical length of at least 5, and then adding to the resulting intermediate, and heating therewith under polymerizing conditions, a substantially chemically equivalent amount of a diprimary diamine having a radical length of at least 6 until the resultant polyamide exhibits fiber-forming properties.

7. A process for making polyamides which comprises reacting, at amide-forming temperatures, a diprimary diamine having a radical length less than 6 with at least two chemical equivalents of a diester of a dicarboxylic acid having a radical length of at least 5, and then adding to the resulting intermediate, and heating therewith under polymerizing conditions a substantially chemically equivalent amount of a diprimary diamine having a radical length of at least 6 until the resultant polyamide exhibits fiber-forming properties.

8. A process for making polyamides which comprises reacting, at amide-forming temperatures, a diamine having a radical length less than 6 with at least two chemical equivalents of an amide-forming derivative of a dicarboxylic acid having a radical length of at least 5, hydrolyzing the resulting product thus formed to a dicarboxylic acid and then adding to the last mentioned dicarboxylic acid, and heating therewith under polymerizing conditions, a substantially chemically equivalent amount of a diamine having a radical length of at least 6, both of said diamines having at least one replaceable hydrogen atom on each amino nitrogen atom.

9. A diamine-dibasic carboxylic acid salt wherein said diamine has the formula $$H_2N(CH_2)_zNH_2$$

and said dicarboxylic acid has the formula $$HOOC(CH_2)_y—CO—NH—(CH_2)_z$$
$NHCO(CH_2)_yCOOH$ in which $x$, $y$, and $z$ are integers, $x$ being at least 4, $y$ being at least 3 and $z$ being less than 4.

10. A salt of the formula $$NH_2(CH_2)_zNH_2.HOOC(CH_2)_y—$$
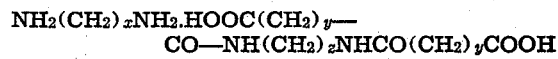$CO—NH(CH_2)_zNHCO(CH_2)_yCOOH$ in which $x$, $y$, and $z$ are integers, $x$ being at least 4, $y$ being at least 3 and $z$ being less than 4.

11. The process which comprises subjecting to polymerizing conditions the salt set forth in claim 10.

12. A linear polyamide having recurring structural units of the general formula $$—NH(CH_2)_zNHCO(CH_2)_y$$
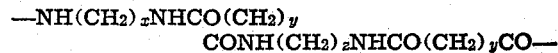$CONH(CH_2)_zNHCO(CH_2)_yCO—$ in which $x$, $y$, and $z$ are integers, $x$ being at least 4, $y$ being at least 3 and $z$ being less than 4.

13. The process for making polyamides which comprises reacting, under polymerizing conditions, a diamine with a dicarboxylic acid, the said diamine having a radical length of at least 6 and having at least one hydrogen atom on each amino group, and the said dicarboxylic acid containing two antecedently formed carbonamide links in the chain separating its carboxyl groups, said carbonamide links being separated by a segment of the said chain having less than 4 carbon atoms, and each of the said carbonamide links being separated from the carboxyl group of the said dicarboxylic acid nearest thereto by a further segment of the said chain, such further segment having at least 3 carbon atoms.

14. A diamine-dibasic carboxylic acid polyamide wherein the dibasic carboxylic acid radicals in the polymer chain have a radical length of at least 5 and alternate diamine radicals in the polymer chain have a chain length of less than 6 and more than 6, respectively.

WILLIAM E. HANFORD.